United States Patent
Weinspach

(10) Patent No.: US 6,551,108 B1
(45) Date of Patent: Apr. 22, 2003

(54) DEMONSTRATION DEVICE MODELLING A LIVING ORGANISM

(75) Inventor: Paul-Michael Weinspach, Dortmund (DE)

(73) Assignee: Fraunhofer-Gesellschaft zur Forderung der Angewandten ForschungE.V., Munich (DE)

(*) Notice: Subject to any disclaimer, the term of this patent is extended or adjusted under 35 U.S.C. 154(b) by 0 days.

(21) Appl. No.: 09/508,349
(22) PCT Filed: Sep. 10, 1998
(86) PCT No.: PCT/EP98/05789
§ 371 (c)(1), (2), (4) Date: May 15, 2000
(87) PCT Pub. No.: WO99/14726
PCT Pub. Date: Mar. 25, 1999

(30) Foreign Application Priority Data

Sep. 12, 1997 (DE) .......... 197 40 207

(51) Int. Cl.⁷ .............. G09B 23/28
(52) U.S. Cl. .......... 434/266; 434/272
(58) Field of Search .......... 434/266, 267, 434/272; 104/53, 84; 472/136

(56) References Cited

U.S. PATENT DOCUMENTS

| | | | | |
|---|---|---|---|---|
| 268,503 A | * | 12/1882 | Lafferty | 472/136 |
| 339,828 A | * | 4/1886 | Ward | 472/136 |
| 641,839 A | * | 1/1900 | Clay | 472/136 |
| 845,967 A | * | 3/1907 | Moscovitz | 104/67 |
| 4,865,550 A | * | 9/1989 | Chu | 434/267 |
| 5,689,919 A | * | 11/1997 | Yano | 52/167.6 |
| 6,332,301 B1 | * | 12/2001 | Goldzak | 52/729.2 |

FOREIGN PATENT DOCUMENTS

| | | | | |
|---|---|---|---|---|
| DE | G 93 13 774.5 | | 12/1994 | |
| WO | 97/27573 | | 7/1997 | |
| WO | WO97/27573 | * | 7/1997 | ......... G09B/23/32 |

* cited by examiner

Primary Examiner—Derris H. Banks
Assistant Examiner—Kurt Fernstrom
(74) Attorney, Agent, or Firm—Barnes & Thornburg

(57) ABSTRACT

The invention relates to a demonstration device (401) which is a model of a living organism enlarged at least 50 times. Demonstration devices of this type, for example, a model of a person lying down, help explain and show how the biological processes which take place in the living organism are related. The inventive demonstration device (401) has an outer skin. Inside are functional elements representing the organism's organs, vascular system, joints, etc. According to the invention, it is possible to both walk and travel in the demonstration device and its functional elements.

29 Claims, 14 Drawing Sheets

Figure 1:
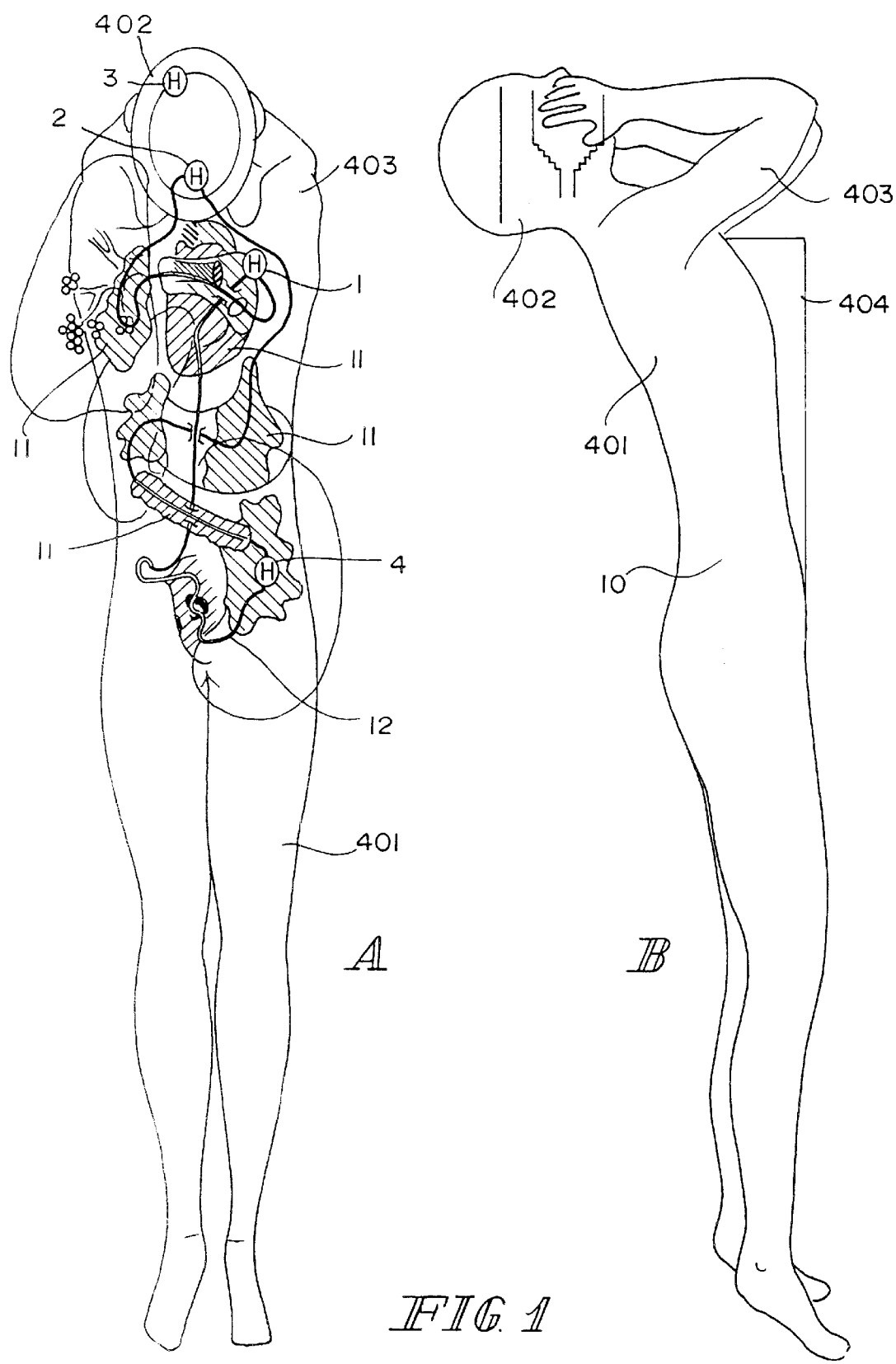

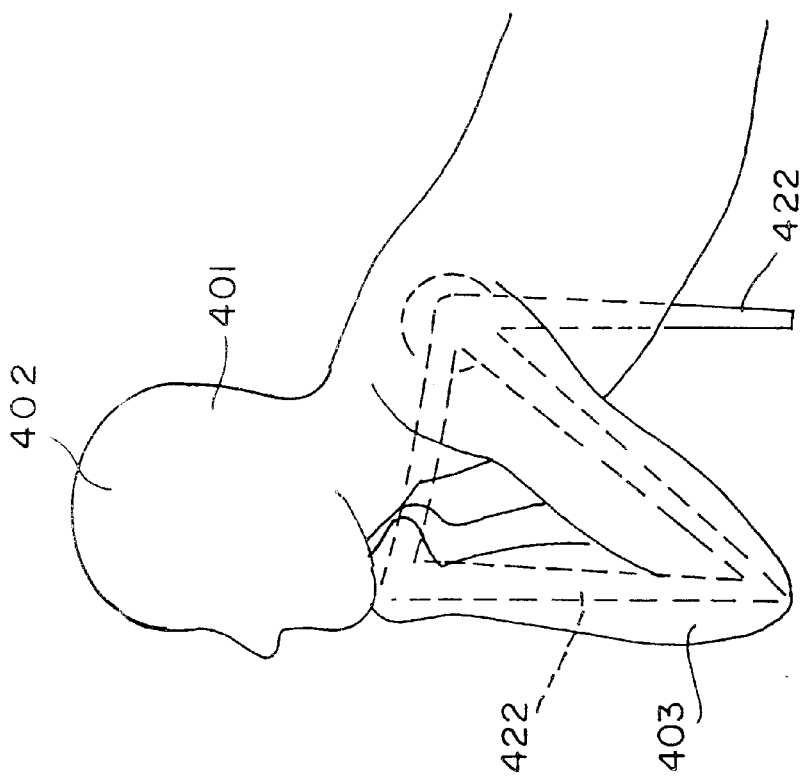
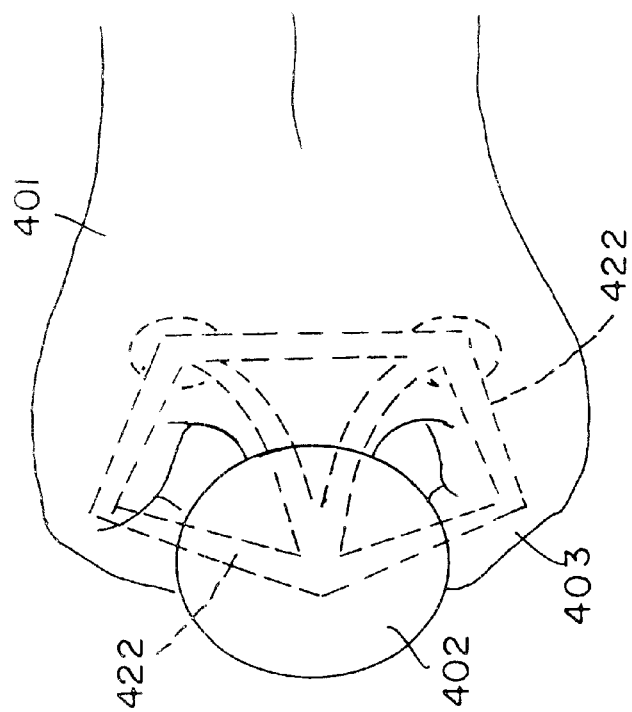
FIG. 5

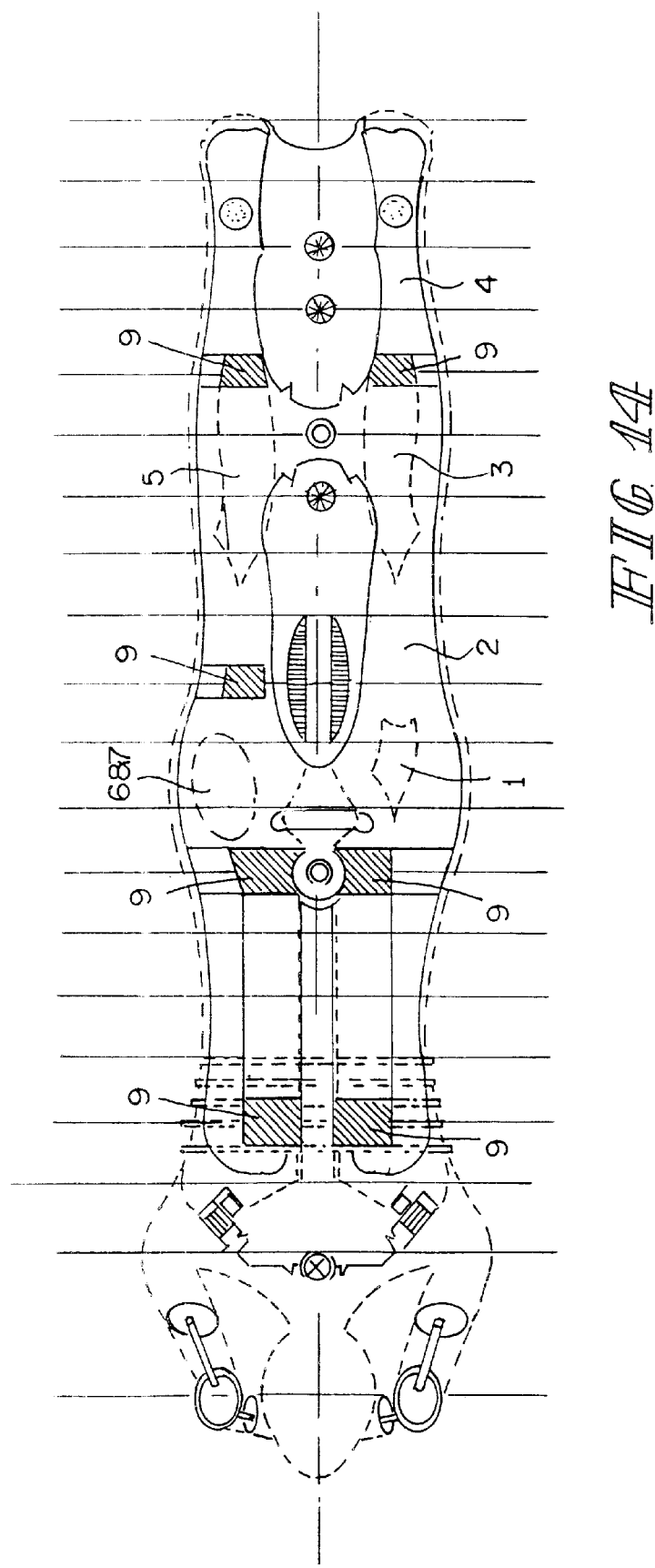

DEMONSTRATION DEVICE MODELLING A LIVING ORGANISM

CROSS-REFERENCES TO RELATED APPLICATIONS

This application is a U.S. national application of international application serial No. PCT/EP98/05789 filed Sep. 10, 1998, which claims priority to German serial No. 197 40 207.0 filed Sep. 12, 1997.

The invention concerns a demonstration device in the form of a living organism enlarged at least 50 times, wherein an outer skin surrounding a cavity simulates the form of a living organism. In the cavity formed by the outer skin of the demonstration device are arranged functional elements which correspond to the organs of the respective living organism.

Owing to the complexity of the organs and joints present in living organisms, particularly in human beings, there is a great need to make the functions of these organs and joints readily transparent and understandable.

WO 97/27573 discloses an enlarged model of a human being in which the human internal organs are arranged largely in their respective anatomically correct positions. This human model is mounted face up on its back and shows an androgynous human being. The organs arranged in the human model are designed for walking. As a result, according to WO 97/27573 an extraordinary sense of adventure as well as the sense of a journey of discovery are conveyed. Owing to the model being designed only for walking, however, it is not possible to convey the layout and function of the human organism in a didactically significant manner within a reasonable time.

By contrast U.S. Pat. No. 4,865,550 shows a model of two sleeping persons in which, but not in anatomically correct layout, the organs of an individual person are arranged in such a way that they can be travelled by rail. With this model only the head regions are fulls formed, while the outer form of the building containing the organs in the remaining parts has the form of a blanket. With this model, consequently, there is no model of the human being which can be recognised as such from the outside. Here, again, the imparting of knowledge about the layout as well as the function of the individual human organs is conveyed only imperfectly, because when travelling through the organs there is no room left for an individual knowledge-imparting time appropriate to the respective observer.

Starting from this, it is the object of the present invention to provide a demonstration device in the form of a living organism with which it is possible to make the functionality of the -essential organs, vascular systems, reproductive organs, joints and the like which are present in the living organism, accessible and understandable to an observer in a didactically optimum manner and within a reasonable time.

This object is achieved by the introductory part of claim 1 in conjunction with its characterising features.

The demonstration device according to the invention is made accessible with its functional elements by means of body function-specific path systems. Path systems which can be travelled along by vehicle and also on foot are provided. Thus it is possible to allow the individual observer a way of approaching the individual organs, vascular systems and/or joints or the like which matches his interests and his perceptive faculties. For instance, by travelling by vehicle through the individual organs he can gain a quick overview of the relationships between the individual organs etc. in a fast, spectacular and impressive manner, and then access the organs etc. in which he is particularly interested on foot, observing detailed information, for example in "child zones" or "child-friendly functional elements" adapted to the abilities of children as well. An iterative approach of this kind allows optimum imparting of knowledge. In the same way, differentiation of the individual ways of imparting knowledge is possible by rail or on foot depending on the age of the visitors to the demonstration device. Thus for example children, who cannot yet be given the knowledge about the relationships between the organs of the human body through charts or experiments can nevertheless be given an idea by means of a rail journey which is of interest to this age group.

As the demonstration device according to the invention simulates the form of a living organism, it must have a size which makes it possible to go by vehicle or on foot over the demonstration device from the inside. The dimensioning of the demonstration device must be selected accordingly. As a rule, therefore, enlargement by at least 50 times is required.

Advantageous developments of the demonstration device according to the invention are given in the dependent claims.

The outer skin can be designed as a monolithic shell, preferably as a self-supporting hall, and/or be carried by support elements. Parts of the outer skin can be made transparent to give a free view of the interior of the living organism and for example an anatomically correctly placed functional element. As travel over the demonstration device is to be possible both by vehicle and on foot, it is advantageous not exclusively to arrange the functional elements in their anatomically correct positions in the demonstration device, but to arrange them according to the individual access options in the interests of optimum use of the interior of the outer casing. It is also possible to set up separate organ systems for the two types of access, vehicle and walking, as the two types of access are intended to convey different aspects. The vehicle access type is intended more for a spectacular travel effect, whereas with the functional elements accessible on foot, in which lingering of the observer according to his needs is possible, detailed knowledge in written form can be conveyed, for example by charts.

Accordingly the travel way can run in a tube, preferably a closed tube or closed tube system, by means of a driverless railway cabin system with individual centrally controlled carriages. Thus the travellers are not exposed to any distraction by elements not belonging to the travel way or by visitors travelling in front or behind. The overall result is also an optimum cheap solution, as the individual carriages can travel close together one behind the other.

In the preferred embodiment of the demonstration device, in the event that a human being is simulated, with an enlargement of 80 to 120 times there is an optimum size of the demonstration device. Favourably the demonstration device is arranged horizontally so that optimum static conditions as well as the possibility of walking and travel by vehicle are produced. The human being can in this case lie on its belly, lifting its head over the terrain. It is particularly favourable for static support of the very large, heavy head if the arms are arranged in such a way that the head is supported on them.

The outer skin can here be designed as a self-supporting hall or carried by support elements. In this case it can be either a self-supporting frame structure or an outer skin which is secured by support pillars. In any case it is necessary for enough space to be left in the demonstration device to arrange and visit the corresponding functional elements and path systems.

The material of the demonstration device can either be of a metallic nature, or be selected from concrete or the like or from plastics. The respective wall thickness is determined by the material conditions.

The functional elements which simulate the organs etc. of the respective living organism are essentially the most important organs etc. of the living organisms. For the preferred embodiment of the human being, heart, liver, kidneys, stomach, digestive tract, sense organs, brain, nervous and vascular systems, lung and the large and small joints such as shoulder joints, knee joints, finger joints and toe joints are to be provided as functional equipment.

These individual functional elements can be made interactive so that they can be operated by the observer and the function becomes clear. The manner of operation of the functional elements can be illustrated by optical and/or acoustic measures.

Particularly interesting didactic access is produced when in the functional elements the corresponding technical analogon which is often known to the observer even from his everyday life is placed by the side of the physiological functions. This imparting of content can be improved by assigning to the individual organ systems, such as for example the system consisting of digestive tract and internal organs or heart, circulation and lung, their own path systems, for example their own railway tracks.

Figure 2:
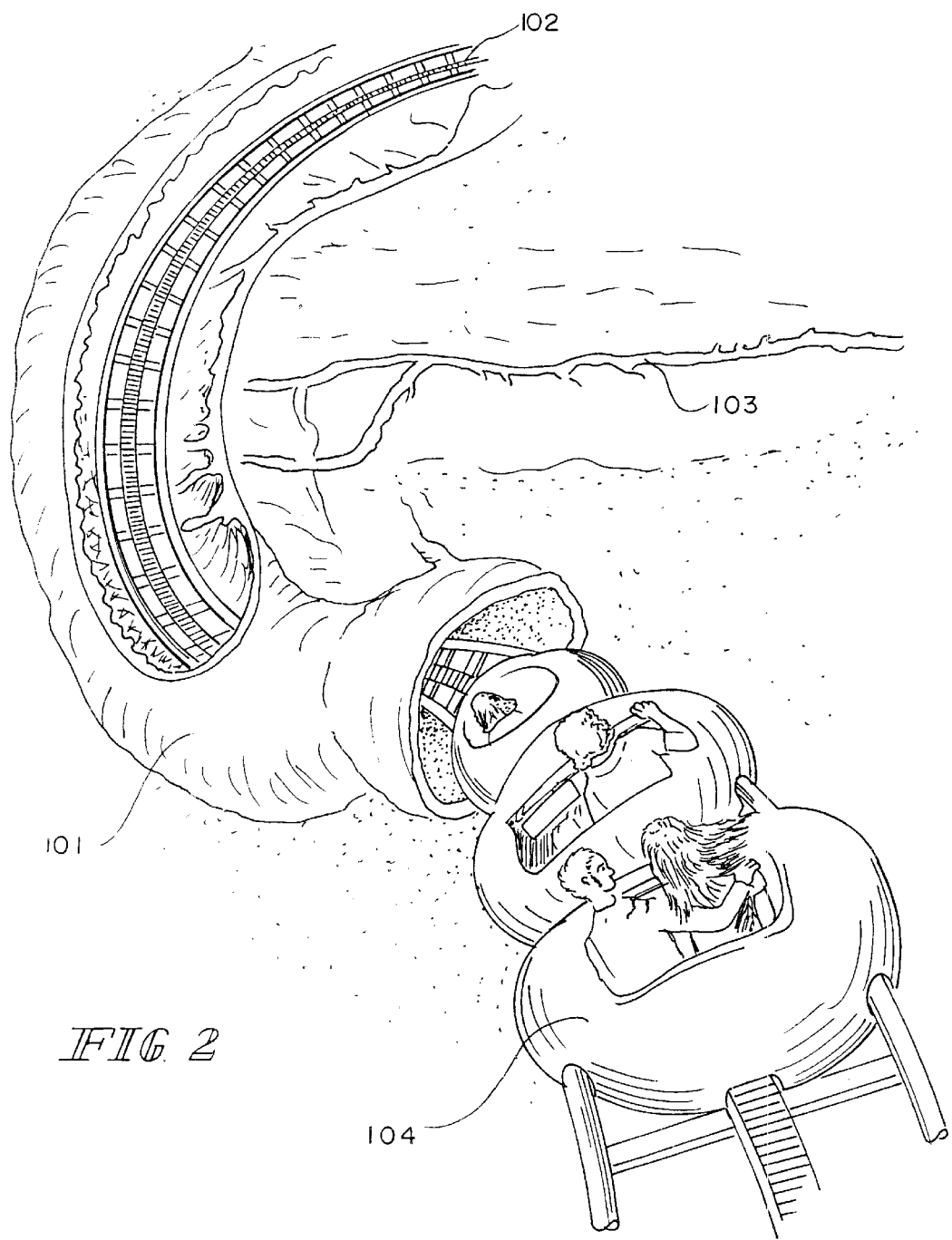
Figure 3:
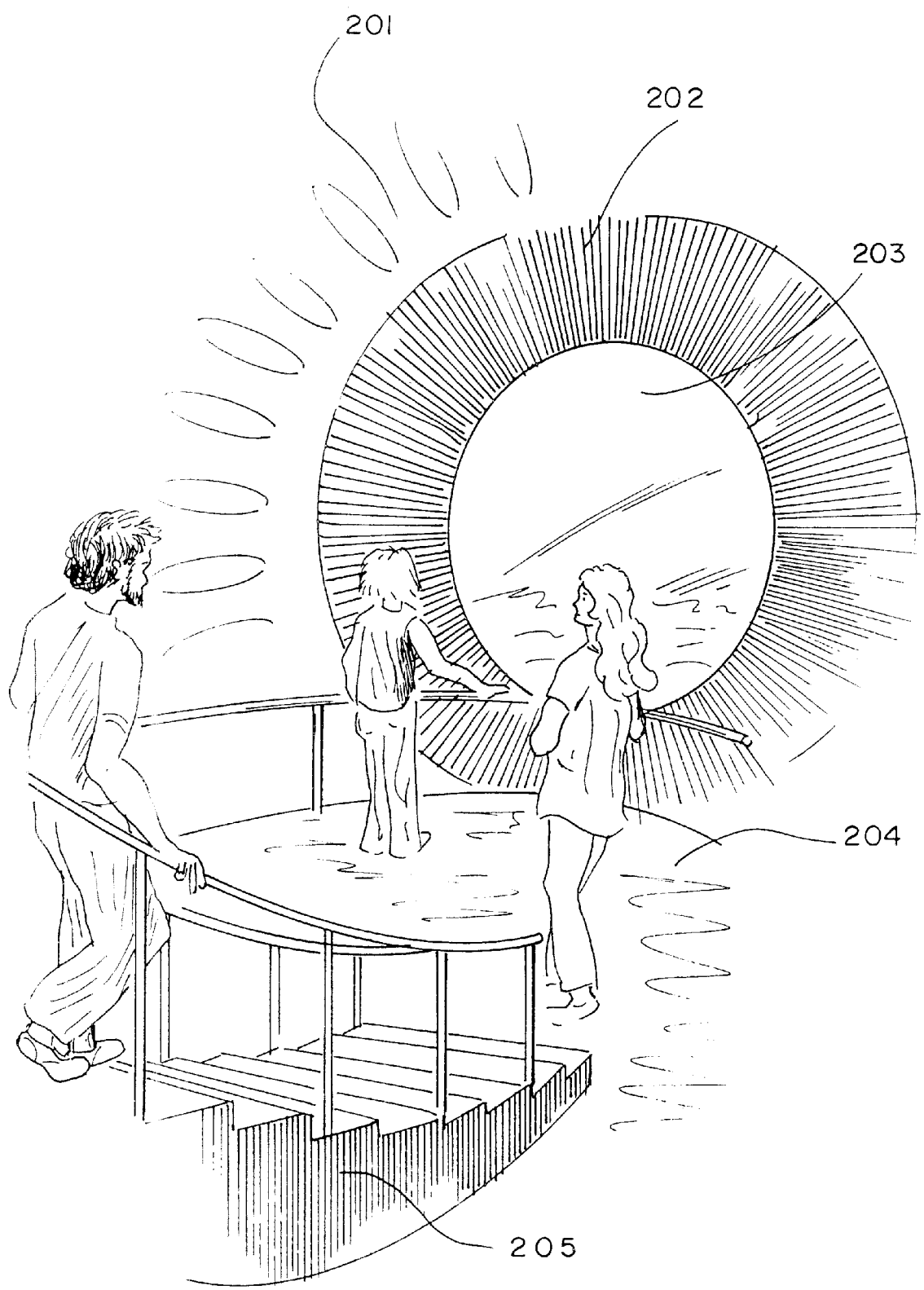
Figure 4:
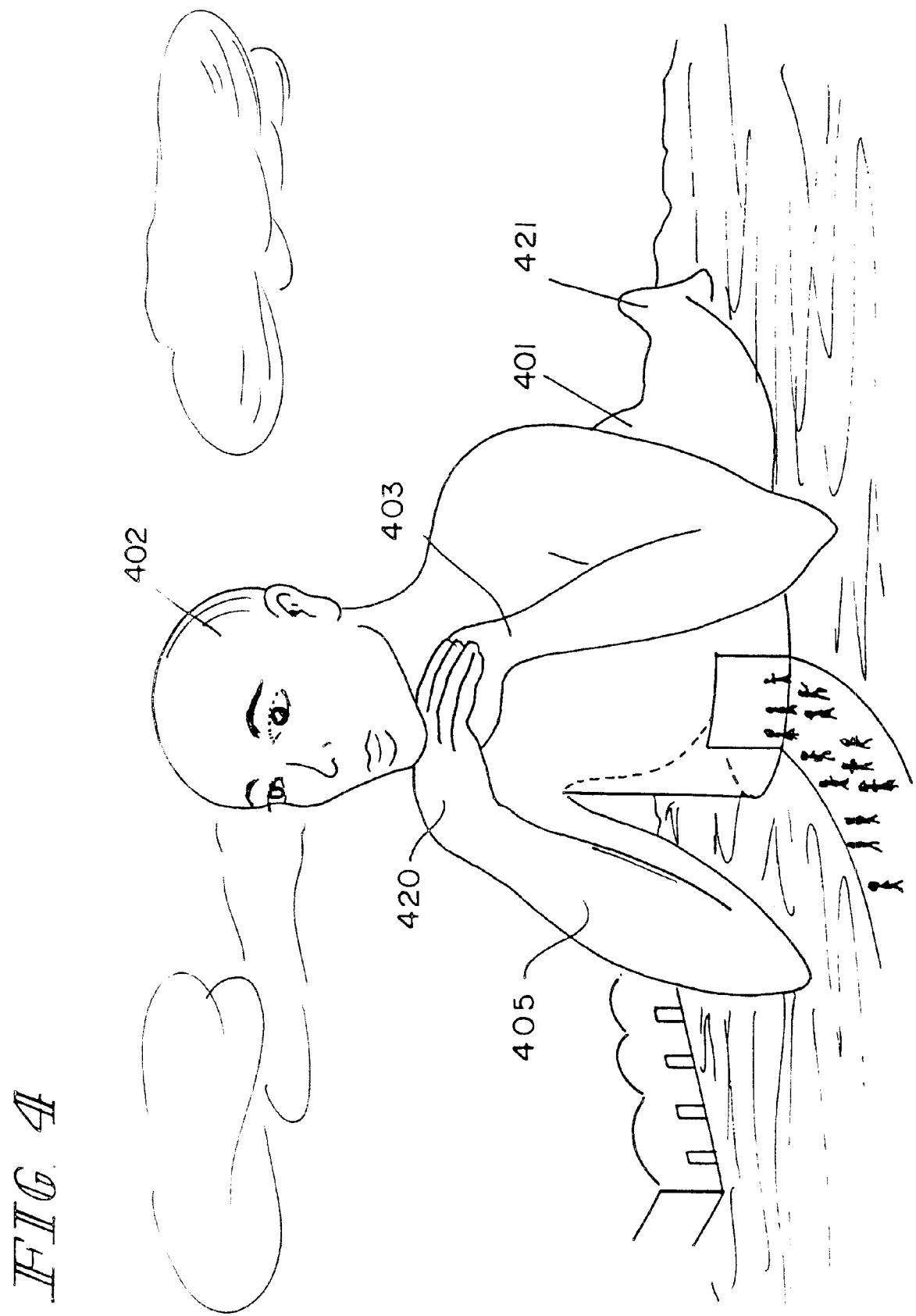
Figure 9:
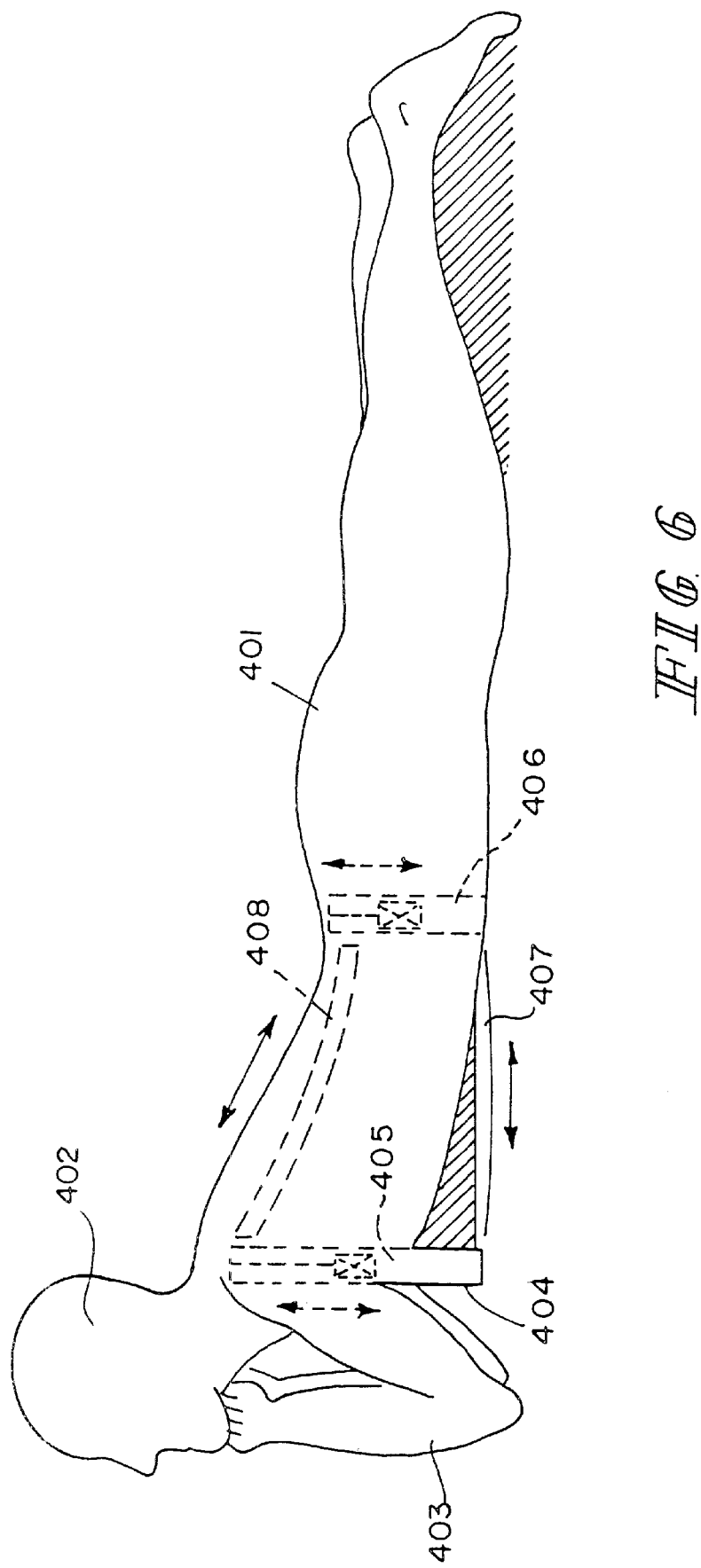
Figure 7:
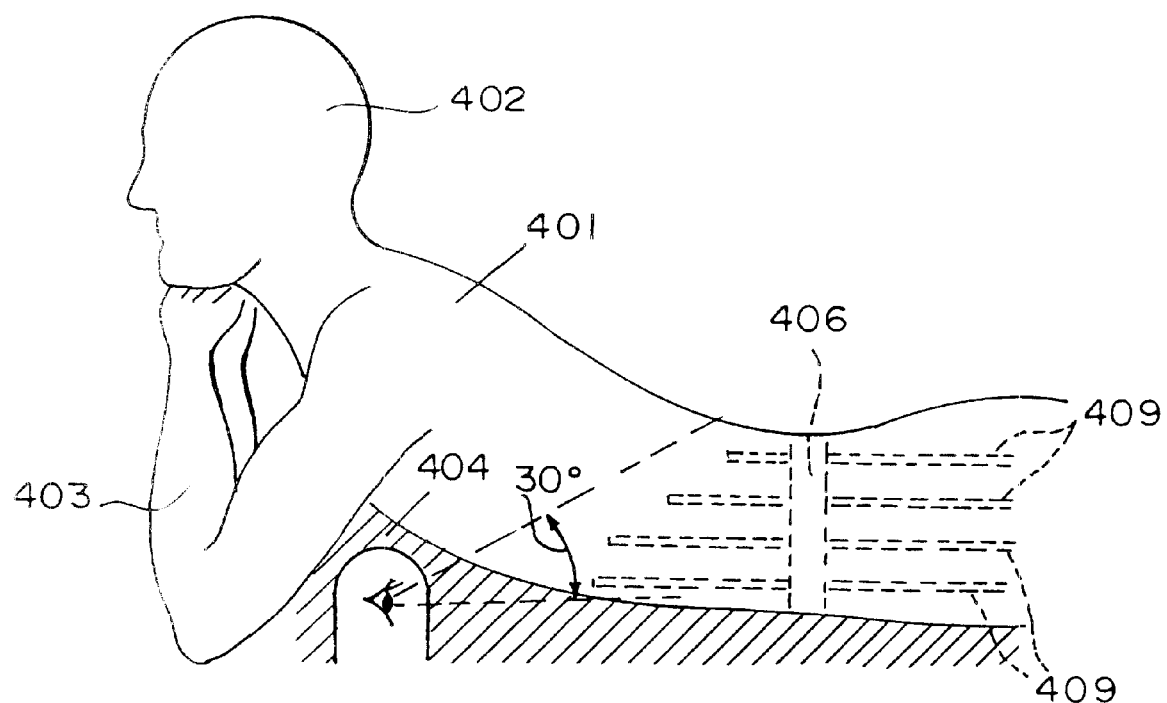
Figure 8:
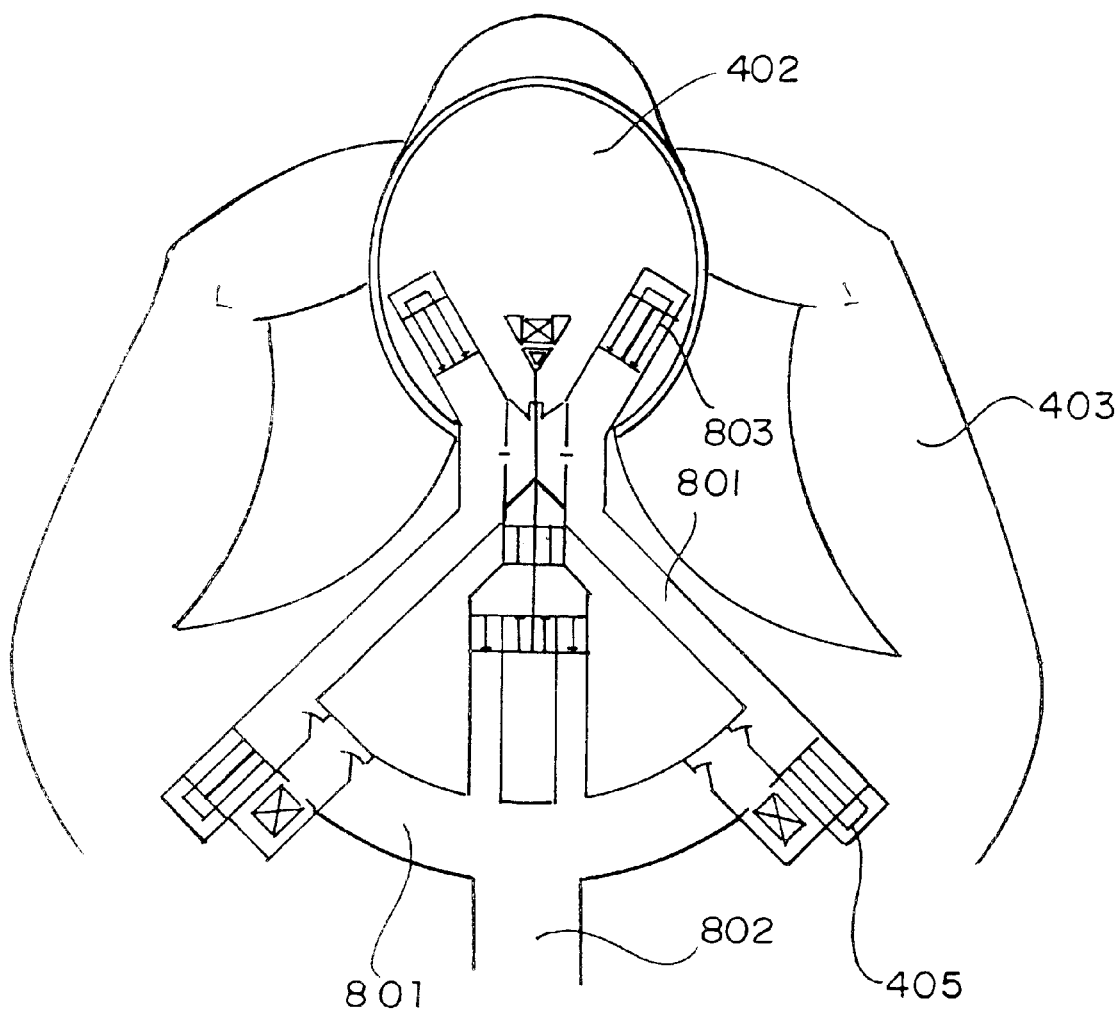
Figure 9:
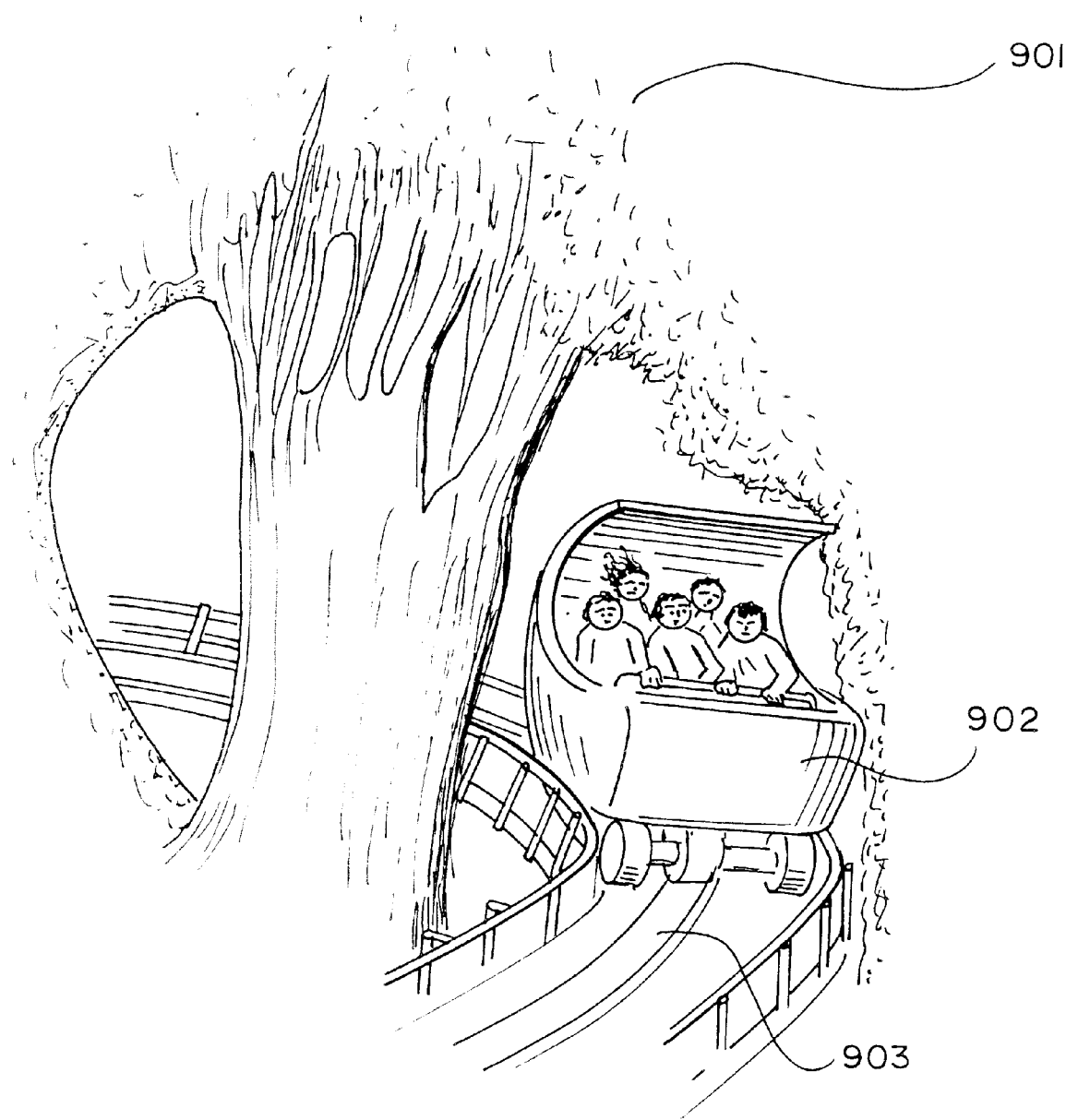
Figure 10:
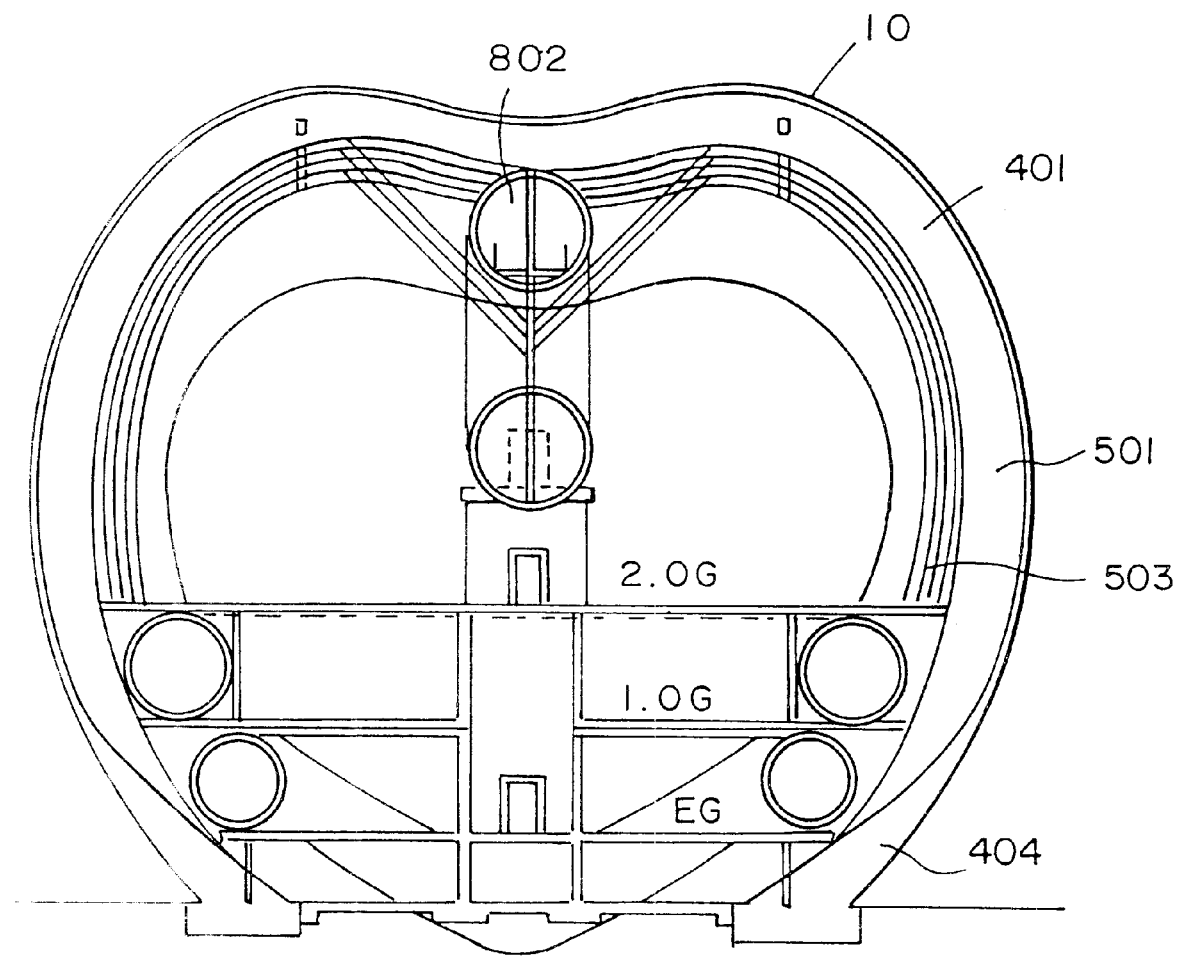
Figure 11:
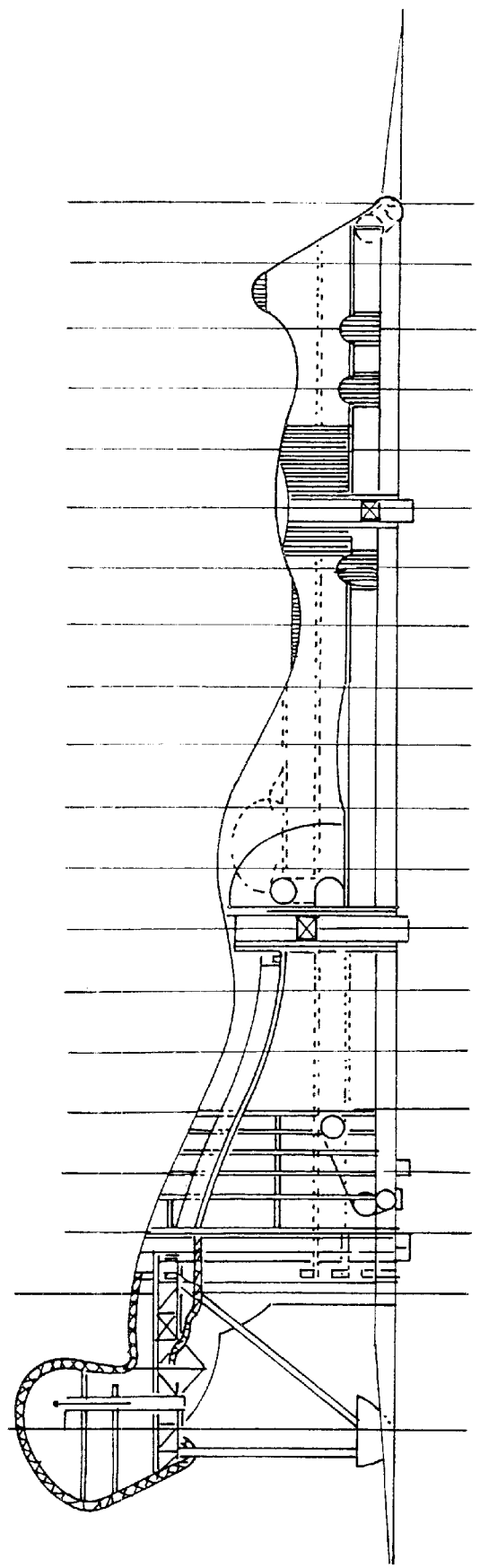
Figure 12:
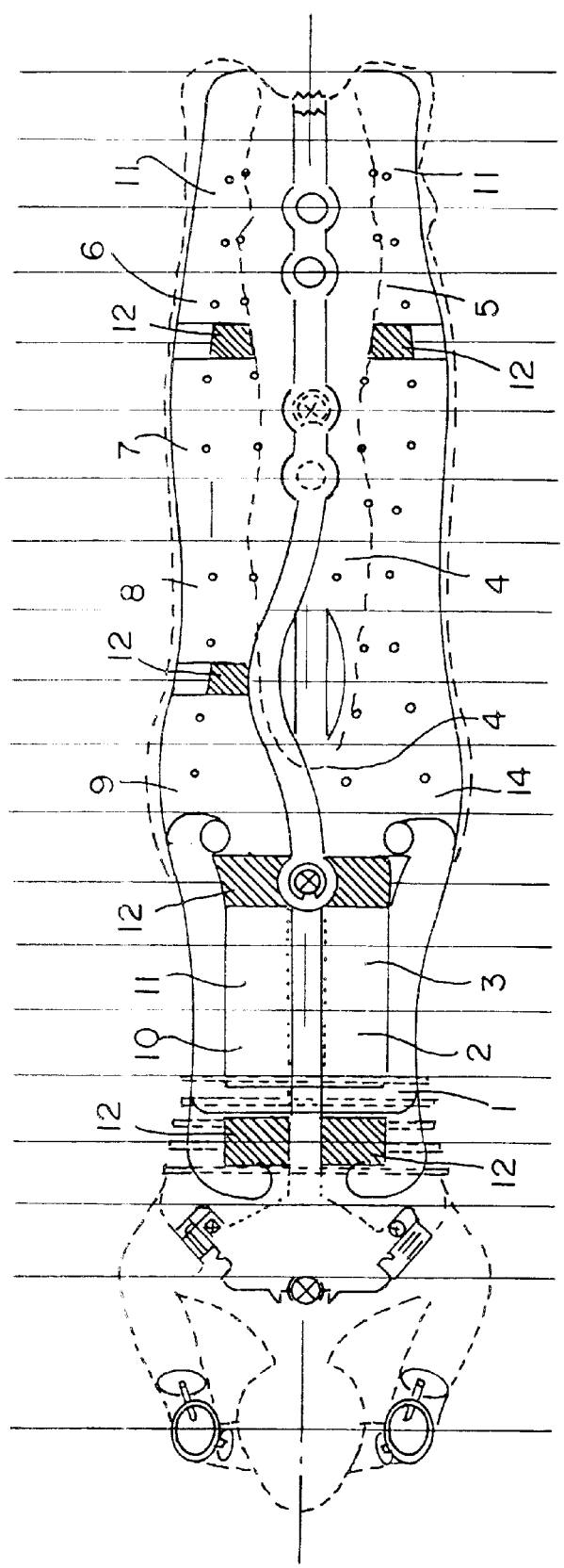
Figure 13:
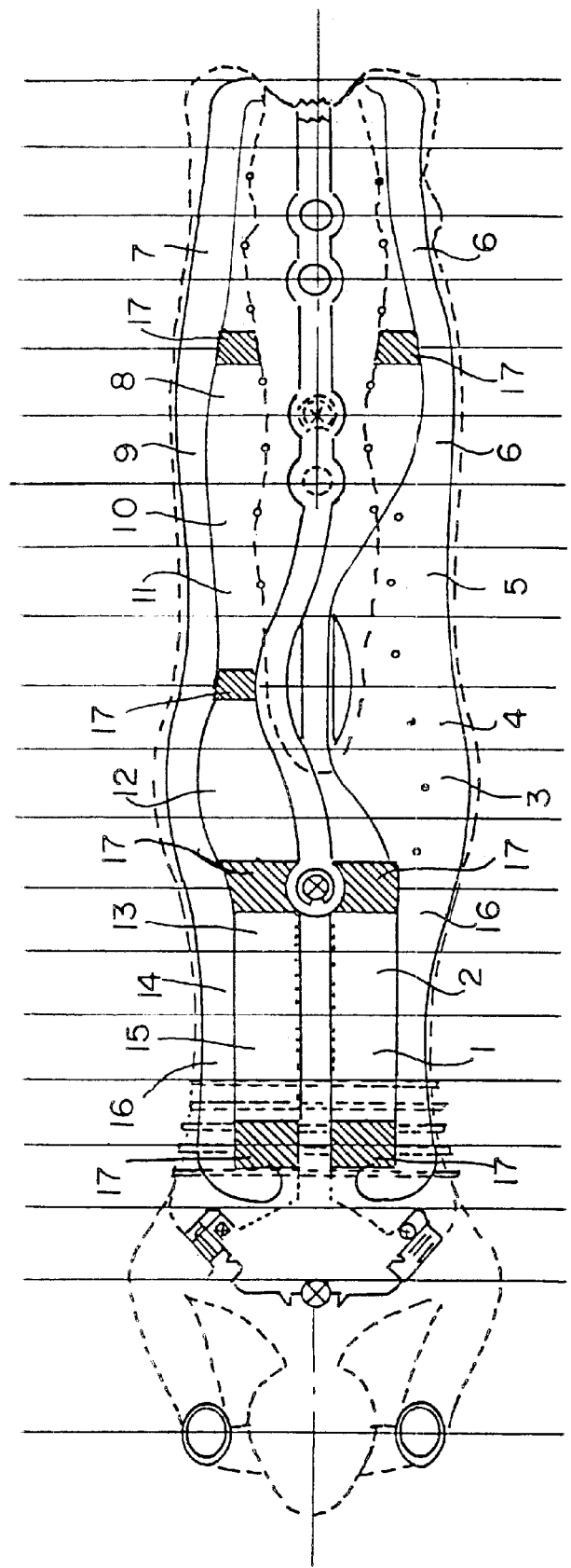

Below, some advantageous embodiments of the demonstration device according to the invention are described. The drawings show:

FIG. 1 a demonstration device according to the invention;

FIG. 2 a path system;

FIG. 3 another path system;

FIG. 4 another demonstration device according to the invention;

FIG. 5 the mounting of the demonstration device according to the invention from FIG. 3;

FIG. 6 the access paths of a demonstration device according to the invention;

FIG. 7 the internal layout of a demonstration device according to the invention;

FIG. 8 the path system in the chest and head regions of a demonstration device according to the invention;

FIG. 9 a path system of a demonstration device according to the invention;

FIG. 10 a cross-section through the chest region of a demonstration device according to the invention;

FIG. 11 a vertical longitudinal cross-section through a demonstration device according to the invention;

FIG. 12 a horizontal cross-section through a demonstration device according to the invention;

FIG. 13 another horizontal cross-section through a demonstration device according to the invention; and FIG. 14 another horizontal longitudinal cross-section through a demonstration device according to the invention.

FIG. 1 shows a demonstration device 401 according to the invention. This has an outer skin 10 in the form of a human being. This human being is shown lying down, with a head 402 supported on arms 403. For static support of the building in the form of a human being, below the chest region is arranged a substructure 404 as a surface to rest on.

FIG. 1a shows the path of a railway 12 through the functional elements 11 arranged in an anatomically correct manner in the human being and designed as internal organs. Entry to the railway 12 is at point 1 as entry into the heart via the vena cava sup. Exit from the heart is via the arteria pulmonalis sinistra. From there the railway 12 continues into a functional organ which is designed as a lung. In an alveolus of the lung there is a change-over to the "air side", and the railway 12 continues through the trachea, which symbolises breathing out, into the nose and throat cavity to point 2. At point 2 the observer can get to know the buccal cavity. From here it is possible for the observer on foot to look at a functional element designed as an eye 3 or one designed as an ear, or to take a trip through the "brain".

The rail journey is then continued from point 2 as a "piece of food" through the oesophagus into the stomach and the intestine. From the intestine the railway 12 changes over to a functional organ designed as the liver and travels on into the kidney at point 4. At point 4 again there is a change-over of the railway 12 into the Fallopian tube and from there on into the uterus, from where the railway 12 runs back through a vein to the point of entry 1.

FIG. 2 shows the passage of a railway 104 through a functional element 101 designed as the intestine. Here, as below, corresponding elements are given corresponding reference numbers. Also shown are a track system 102 and supply blood vessels 103. The railway consists of individual remote-controlled carriages for two persons each. By travelling through the individual organs, here shown with the aid of a functional element 101 in the form of the intestine, the observer is given a feeling for the relationships and transport of substances, for example food within the human system.

FIG. 3 shows a functional element 201 designed as an eye with an iris 202 and a pupil 203. In the eye is arranged a path system 205 with a platform 204 for walking, so that from the eye 201 the observer has an outlook over the landscape surrounding the demonstration device.

FIG. 4 shows another demonstration device according to the invention in the form of a human being 401. This demonstration device lies on its belly with the upper torso upright. A head 402 rests on crossed backs of the hands 420, and the lower arms 403 are almost vertical. The human being 401 has legs 421 which are slightly splayed and form an angle of about 20°. Between the legs 421 at a level of approx. 7 m or alternatively 12 m from the upper edge of the ground is provided a terrace. Hence in the region of the legs there are large areas which can be used for exhibition purposes and cannot be seen from the outside. In order that from a bird's eye view there is still the impression that the body has been simulated true to life, the terrace surface is designed as a green roof for walking. Below the upper torso of the human being 401 is provided a front structure 404 in which is located the entrance region to the demonstration device. This affords the advantages that a great deal of space is gained in the chest region and secondly there is static support of the demonstration device in the chest region.

The outer casing of the demonstration device is kept partly transparent, for example in a region 405 of the lower arms. There, inside the outer skin muscle fibres are simulated by means of steel tubes, so that the observer is given the impression of looking directly on to the subcutaneous muscle regions.

FIG. 5 shows static support of the chest and head regions of the demonstration device 401. In FIG. 5 the paths which divert the load are shown by bold stripes 422. The head 4.01 is supported essentially by the lower arms 403, wherein the latter due to their trapezoidal layout completely take up and divert the corresponding loads. The chest region is fully supported by the substructure located there and by the upper arms of the demonstration device.

For the demonstration device according to the invention, division between the casing of the building, i.e. the outer skin, and the actual interior lining is recommended for reasons of fire prevention. If the interior lining is designed as an independent building with separate escape routes, the upper torso can be declared a free area which is housed in or roofed over. This division between spaces for people to stay continuously and other areas allows a lower room temperature in the upper torso and lower fire loads. Another advantage of division into internal and external structures lies in the resulting possibilities of variation in the building designs.

In FIG. 4 the two lower arms 403 which support the head 402 stand on elbow foundations and are joined together in the transverse direction by the hands 420 crossed under the chin, so that they form a bridge-like frame structure on which the head rests. As shown in FIG. 6, on the transverse axis of the shoulders are located two staircase towers 405 made of reinforced concrete with glass lift cabins oriented towards the interior of the body on the longitudinal side. The two towers 405 are joined together by a steel latticework structure at shoulder level and serve for additional stiffening. The head 402 is made as light as possible as a Mero latticework system or an equivalent solution and lined with aluminium sheets. A thermoskin serves for thermal insulation and allows the surface of the head to be modelled true to life.

The surfaces of neck and hands, feet, thighs and in the region of hip and buttocks are modelled as naturalistically as possible from sprayed concrete and then provided with a thermoskin together with surface treatment. The elbows too are made of sprayed concrete. Here it is not so much a question of preserving the true-to-life impression, as rather the static function as a foundation for the lower and upper arms. For the skin of the knees and calves, as can be seen in FIG. 4, a light-transmitting textile covering is used (PTFE membrane with 15% light transmission, fire grade A2, k-value=5) which can also be used on the upper torso.

The form of the upper torso is predetermined by the costal arches, and these are alternatively designed as a steel latticework structure by means of oval tubes, by glulam joists or by means of in each case two parallel curved T-girders. Between the girders -are mounted glass strips including opening flaps for smoke/heat extraction, which on the one hand ensure direct incidence of natural light, but on the other hand emphasise the function of the ribs as a decorative element.

Both on the scalp and on the heels can be mounted glass domes. Domes of this kind can also be used in the roof region of the thighs and inside the terrace structure, and allow natural ventilation and natural light incidence.

The space inside the thighs is designed as a steel and glass structure.

As an alternative to the transparent solution described above, the whole body can also be made as a monolithic shell from sprayed concrete. Taking into consideration the surface tension of the concrete and keeping the supporting structure for the head described in FIG. 5, in this way a stable, self-supporting hall can be produced. At the same time, however, relatively high weights are to be taken into account. The greatest internal forces (bending moments around 400 kNm) are in this case to be found in the region of the back and can be absorbed by conventional reinforcement or by prestressing the back parts.

In this case manufacture of the torso with conventional frameworks is possible. Individual parts of the body such as head and hands can be made very thin by sprayed-concrete techniques next to the building site and put in position with a crane. In a reinforced concrete design the structure is then to a large extent maintenance-free and the surface can be modelled as desired. For example it can be left in exposed concrete or given a shiny silvery covering with special steel or provided with artistic paintwork. This outer skin in case of the compact solution can be adapted to modern tastes at any time by means of a self-supporting sprayed concrete hall.

Heat insulation can easily be accomplished with the choice of cellular concrete or by applying an insulating coat. A reinforced concrete shell is a particularly suitable solution for achieving a fire prevention concept as well.

The reinforced concrete shell too can be perforated by window openings and/or transparent components for natural ventilation and lighting or to represent transparent skin regions.

FIG. 6 shows the path means inside the demonstration device. In the region of the shoulders, as already described, is provided a lift system 405 for transporting the visitors to the chest and head regions. Furthermore a second lift system 406 is provided in the hip region. Between the entrance, which is arranged in the head region of the substructure 404, and the second lift system 406 extends in the substructure a building 407 for walking, in which can be accommodated for example supply elements and functional elements designed as a demonstration device. At the upper end of the two lift systems the connection is made by means of a vertebral column 408 for walking, which acts as a functional element.

The interior of the demonstration device is divided into four working zones:
1. The substructure 404 on which the upper torso rests also includes the area below the terrace, which is placed between the legs. In this substructure, which in practice can be used as a ground floor, are accommodated supply pipe, wiring, engineering rooms as well as workshops and the like and also the escape routes. The main entrance for the visitors to the demonstration device is also located in this building in the substructure at a level of approx. 2.5 to 3 m.
2. The upper torso is designed as a hollow body in order to be able to demonstrate to the visitor the width and height of the demonstration device. The main entrance leads into this upper torso.
3. In the head are installed floors, partial floors and galleries which contain exhibition areas and functional elements.
4. The fourth zone includes the region from the waist to the feet and contains further exhibition areas and functional elements.

As already described, the connection between the head and the fourth zone is made via the main surface of the upper torso at the entrance level and a lift tower below the shoulders, on the one hand, and via the vertebral column for walking, on the other hand.

The functional elements provided for the visitors, which are designed as illustration and interaction regions, are combined into the following logical units:
Nutrition and digestion
Heart and circulation (with blood and lymphatic system as well as lung circulation)
Lung, respiration and voice production
Sex organs and reproduction (with genetics, cytology and heredity)

Hormone system
Tissues in the body (skin, bones and joints, muscles) Brain, nerves and reflexes An exception is the senses and sense organs. Of course these too could be combined into a logical group, but for good spatial use of the demonstration device it is advantageous to incorporate three of these five senses into higher complexes, for example
taste in the region of nutrition and digestion,
smell in the region of lung and respiration and
touch in the region of skin.

The sense organs of eye and ear are presented in independent exhibition regions.

The spatial programme is complemented by central equipment such as toilet areas and catering as well as by special rooms such as rest zones, child-friendly display zones, a "glass operating theatre", seminar rooms and the like.

The two logical units of nutrition and digestion as well as heart/lung/circulation are not just designed as pure exhibition areas. Medical backgrounds are here too presented within the framework of in each case an adventure trip through the vessels and organs.

In the fourth zone, from the feet to the waist, are located the main exhibition areas. Here are also accommodated the track sections for travel through the functional elements designed as organs. Furthermore in this zone are located a restaurant, toilet facilities, seminar rooms, simulators, a cinema, central workshops and the administration.

This fourth zone is divided into four storeys accessible to the public (FIG. 7, reference number 409), which are joined to each other in the region of the waist by the two lift towers described above. By means of overhangs of the ceilings of the respective levels in the transverse direction it is possible to get a sense of the taper of the horizontal body from the shape of the outer skip. The inner building and the outer skin are joined to each other by the overhangs. Due to this horizontal connection, in the regions below the largest cross-section the dome-like structure of the outer skin can be prevented from buckling.

The region of the upper torso is used for the spatial experience. Furthermore information counters and the central lift and staircase units described above are accommodated here, offering access to the head. In the region of the upper torso in the substructure 404 is located the main entrance. As shown in FIG. 7, the visitor in the entrance region can look into the free chest space with a viewing angle of 30° and see its huge dimensions.

The head 402 also contains several floor levels (see FIG. 11). In it are also accommodated the demonstration regions, for example for brain, nerves and reflexes, eye and ear.

FIG. 8 shows the outline of the first level of the head region. This level offers space for toilet facilities and a cafe. The head region is accessed via the lift shafts 405 arranged in the chest region. Between the head region and these lift shafts 405 are located crossings 801 and, inside the head region to access the individual levels in the head 402, staircases 803. Also shown is the vertebral column 802 for walking, for connecting the head region to the fourth zone.

The crossings 801 from the head to the shoulder, which in the longitudinal direction make the reinforced concrete towers accessible as escape routes, are structurally designed as steel latticeworks and provided with a fire prevention covering.

The different levels in the different zones of the demonstration device serve to present different subject complexes, which are mainly explored on foot.

In this practical example, placing all the organs in their positions in the body has deliberately been dispensed with. Nevertheless the visitor can be transported by rail through two important organ systems of the human body. For this purpose two track loops are installed in the fourth zone between waist and feet. The first one is located on the entrance-level floor and contains the digestive tract with oesophagus, stomach, intestine, liver and kidney over a length of approx. 400 m. The second track section is dedicated to the subject of heart/circulation/lung and located on the first floor. It has a total length of approx. 180 m.

The railways are a driverless transport system consisting of individual centrally controlled carriages which offer space for three to six persons. In order to be able to produce the impression of travelling through the body as authentically as possible, only an indispensable minimum of details extraneous to the body are located in the field of view of the observer. Therefore the travel way of each track is designed as a closed tunnel tube which can be entered only via the entrance and exit regions.

The railway is passed through a guide close to the ground, as the guide has less obtrusive optical effects than a guide close to the ceiling on the user. This guide can be track-mounted or trackless, wherein a location-related speed profile which must be followed by the individual cabins of the railway on the trip is fixed.

The carriages will travel at intervals of approx. 12 m, so that the number of cabins on the digestive tract loop is 33 and the number of cabins on the heart/circulation/lung loop is 15. With an average of five passengers per individual cabin and a mean speed of 0.5 m/s, in this way approx. 1,300 passengers an hour can be transported.

Inside the demonstration device are also located functional elements which are designed as exhibition regions and which are accessed via a footpath. The main access axis runs in the longitudinal direction in the middle of the building. The construction of the building symmetrically about the axis on the one hand facilitates orientation for the visitor, but on the other hand also allows maximum flexibility in the use of space.

Particularly in the region of the fourth zone between waist and feet the visitor nearly always has the opportunity to look up freely. The hall is supplied with natural light via light shafts and so an attractive ambiance is created. The rooms in which medicine and technology are displayed for the visitors on foot are designed according to the respective subject. The connecting paths between these rooms are kept neutral to avoid swamping the visitor with stimuli. This purpose is also served by the above-mentioned rest zones. These alternate within the architecture with the actual exhibition areas in order to give the observer the opportunity for a recovery break again and again. Catering operations are provided in two locations, a cafe in the head region from which a view of the surrounding area at a height of just under 50 m is offered, and a restaurant on the third floor of the fourth zone.

By the example of the heart in conjunction with FIG. 9, an architectonic organ design by way of example will be described. The interior of the organs simulates stage wings to give the visitor in the case of hollow organs the lively impression of passing through the respective organ.

In the case of the hollow organs such as for example the heart, decoration of the functional element serves the purpose of giving the observer the feeling that he is inside this organ. Thus for example in FIG. 9 is shown a ventricle of a heart 901 through which a track-mounted railway 902, 903 travels. The railway consists of individual cabins for three to six passengers. The user of the railway here gets the realistic impression of travelling through a ventricle.

With all the other exhibition regions serving as functional elements the wall structures match the subject offered, for example the walls in the subject region of brain, nerves and reflexes show structures of nerve cell tissue.

FIG. 10 shows a cross-section through the upper torso of the demonstration device 401. The upper torso is supported on the substructure 404. Also shown are the individual levels of the substructure in the chest region. Above the three-storey interior lining in the back region is arranged the vertebral column 802 for walking.

It can be seen directly that the outer skin 10 and the interior lining 503 form separate buildings independent of each other.

FIG. 11 shows another vertical cross-section in the longitudinal direction through the demonstration device. Clearly shown is the interior division into storeys of the head region, the substructure and the fourth zone between waist and feet. Also shown is the support of the head and chest regions by the support elements which are constructed as arms.

FIG. 12 shows the outline of the ground floor in the region between waist and feet of the demonstration device. Departing from the previous reference numbers, here the reference numbers denote:
1 the region of nutrition
2 buccal cavity and teeth
3 stomach
4 intestine
5 liver
6 kidney
7 rest zone and senses
8 rest zone and senses and a sales stall
9 a region for children
10 the region of taste at a minibar arranged there,
11 denotes the railway installed on the ground floor, and
12 denotes individual staircase.

The first track loop 11 on the ground floor begins by passing through the oesophagus-and then leads into the stomach 3. The outer casing of the stomach 3, which is filled with digestive juices and food components, is movable to simulate the peristaltic movement. Also on the realistically presented mucous membrane of the stomach are shown pictures of known illnesses such as gastric ulcers. The journey continues from the stomach through the duodenum into the small intestine 4. The passenger here passes through the entrance to the pancreas as well as the bile duct. In the small intestine 4 is provided a zoom effect in which in the course of the journey the villi become more and more detailed and larger, producing the impression that one is getting closer and closer to the intestinal wall. The intestine 4 itself has a total track length of approx. 150 m.

Between intestine and bloodstream the railway 11 crosses over by the fact that the structures of the tubular wall of the intestine 4 change to those of a blood vessel. On continuing the journey, liver and kidney tissues 5 and 6 are then shown. Here the section which can be seen is further enlarged so that finally the structure of the functional unit of liver 5 or kidney 6 is visible. The first track loop ends after passing through the kidney 6.

FIG. 13 shows a cross-section of the first floor in the region between waist and feet. The reference numbers denote, unlike the previous use, the following regions:
1 circulation
2 heart
3 trachea and voice
4 nose and smell
5 children
6 administrative region
7 seminar rooms
8 cafe/bistro
9 shop
10 bones
11 rest zone
12 lung
13 blood
14 lymph
15 immune system
16 a railway installed on the first floor and
17 a staircase The railway 16 installed on the second floor goes, starting with a blood vessel which is designed as a tube, into the right auricle of the heart 2. Through the heart valve the railway 16 then passes into the right ventricle, as shown for example in FIG. 9. In the process the valve function and the contraction of the heart muscle are simulated. Through another heart valve ans a blood vessel the way leads into the lung 12. The cross-section of the vessel becomes narrower and narrower, producing the impression that the vessel would keep on and on ramifying. In the region of the lung 12 the alveoli are visible due to increasing transparency of the vessel wails. Finally the railway 16 changes from the bloodstream to the airstream so that the journey leads through the bronchia and the trachea 3 to the exit station.

FIG. 14 shows a cross-section through the second floor in the region between waist and feet. The reference numbers denote, unlike the previous use, the following regions:
1 a restaurant and simulators
2 hormones
3 skin
4 tissues
4 bones, muscles and joints
6 sex organs and reproduction
7 genetics, cytology and heredity
9 a staircase The exhibition rooms, which are shown in FIGS. 9 to 14 and which cannot be passed through by a railway, are accessible to the visitors on foot. In them are presented anatomical models which offer the visitor the possibility of seeing the structure and function of the body or organs in their entirety.

Due to the fact that it is possible to go through the demonstration device both by vehicle and on foot, the visitor can first be introduced by a rail journey associated with interesting effects into the structures and functions of the functional elements designed as organs, before he then, possibly according to his inclination and interests, in detail and/or selectively turns on foot to the functional elements designed as exhibition rooms in order to get more precise information there. These functional elements designed as exhibition rooms may contain for example torso models showing the position of the organs in the body and the size proportions of the organs relative to each other, or functional models on which can be explained for example as in thee eye short sight, long sight and correction by glasses. Models which explain the diseases are set up there too. Thus for example the high blood pressure model explains the effect of high blood pressure on the organs concerned.

In the exhibition rooms subjects from the field of technology, particularly the subjects of medical technology, can be brought particularly close to the visitor by exhibiting medical equipment and devices. This is possible for example in the field of the appendix and bypass operations in a glass operating theatre, for diagnostic technology by exhibiting for example ultrasonography, for prosthetics by demonstrating computer-controlled prostheses on a dummy or with the aid of a skeleton with implants, for organ-related medical technology by exhibiting a heart-lung machine or a dialyser, or by medical use which can be performed by the visitor himself, such as for example spirometer and audiometer.

In the demonstration device -are also to be shown, as a special concept, analogies between the processes taking place in the human body and technical processes. This leads to a particularly vivid and clear description of biological processes.

Such comparisons can be for example the comparison of chewing with a jaw crusher, digestion with a fermentation system for biological refuse fermentation, the preparation of chemical substances with the synthesising work of the liver, the comparison of surface-active substances with bile, the formation of gallstones with the chemical processes of crystallisation, nucleation and crystal growth, the lung with activated-coke reactors based on carbon-containing adsorbents for flue gas cleaning, the blood circulation and heart with for example diaphragm pumps, pipes, bypass pipes, expansion chambers, hose pumps, non-return valves ant/or throttle valves as well as the kidney with membrane separation technology, the skin and bones with composite materials made of glass fibre-reinforced plastics, the motor apparatus with hydraulic systems, the brain structure and the nervous system with neuronal networks, the eye with the camera, the ear with the piezoelectric effect and biological regulating processes with regulating processes in process engineering systems, for example systems for keeping temperatures constant by means of heat exchangers.

Further functional elements may contain cinemas in which demonstrations of biological processes, for example the origin of human life, take place. By means of special projection techniques which are adapted to the arched ceiling of a projection room, the impression of being in the midst of the action can be conveyed.

Furthermore simulators can be provided, for example simulation theatres or capsule simulators, in order for example to depict journeys through the digestive tract or the bloodstream, or a virus hunt or the path of a nervous impulse through the nervous pathway in a realistic and impressive manner.

In general, due to the possibility of going through the demonstration device according to the invention by vehicle and on foot, it is possible for every visitor to be informed with the knowledge about the internal relationships, layout and functions of a living organism in an impressive manner according to his inclinations and interests.

What is claimed is:

1. A demonstration device modeled after a human being, the demonstration device including an upper torso zone, a head zone, a zone between waist and feet, the head zone and zone between waist and feet being connected by a pathway modeled after vertebrae, and a substructure, an outer skin which surrounds a cavity and which simulates the form of the human being, a first and a second set of elements which simulate at least one of: organs, vascular systems, and joints of the depicted human being, the first and second sets of elements arranged in the cavity, the cavity configured to contain at least one pathway for travel by vehicle through the first set of said elements and at least one pathway for travel by foot through the second set of said elements.

2. The demonstration device according to claim further including support elements for supporting the outer skin.

3. The demonstration device according to claim 2 wherein the outer skin includes a transparent membrane.

4. The demonstration device according to claim 3 wherein the elements visible through the transparent portions of the outer skin are correctly placed anatomically.

5. The demonstration device according to claim 1 wherein the outer skin is formed into a one-piece shell.

6. The demonstration device according to claim 1 wherein the outer skin is self-supporting.

7. The demonstration device according to claim 1 wherein the elements are not correctly placed anatomically.

8. The demonstration device according to claim 1 wherein the elements simulate normal human physiology.

9. The demonstration device according to claim 1 wherein the pathway for travel by vehicle comprises a track system and the pathway for travel by foot comprises a trackless path system.

10. The demonstration device according to claim 9 wherein the pathway for travel by vehicle comprises a tube through which the vehicle travels and/or the pathway for travel by foot comprises a tube through which a person on foot travels.

11. The demonstration device according to claim 10 wherein the tube for travel by vehicle and the tube for travel on foot are closed tubes.

12. The demonstration device according to claim 9 wherein the pathway for travel by vehicle includes a railway system including at least one driverless cabin vehicle and a central control location for individually controlling the at least one driverless cabin vehicle.

13. The demonstration device according to claim 1 wherein the human being modeled is at least one of unclothed and androgynous.

14. The demonstration device according to claim 1 wherein the human being modeled is in the prone position.

15. The demonstration device according to claim 14 wherein the demonstration device is a model of a human being having its head raised.

16. The demonstration device according to claim 1 wherein the demonstration device is a model of a human being having its arms arranged supporting its head.

17. The demonstration device according to claim 1 supported on a surface, and further including a support structure arranged between a portion of the demonstration device which models a torso of the human being and the surface.

18. The demonstration device according to claim 14 including a back region which corresponds in location to the location of the human being's back, the back region being prestressed.

19. The demonstration device according to claim 1 wherein the elements include at least one of: a heart, a liver, a stomach, a kidney, a gall bladder, the vascular system, a nervous system, a brain, an esophagus, a digestive tract, reproductive organs, small and large joints, and sense organs.

20. The demonstration device according to claim 1 wherein the upper torso comprises an open space.

21. The demonstration device according to claim 1 wherein the upper torso comprises a pathway for travel by foot to the head zone, the pathway including at least one of a staircase, a hallway, and an elevator shaft.

22. The demonstration device according to claim 1 wherein the substructure includes at least one of supply pipes and wiring.

23. The demonstration device according to claim 1 wherein the zone between waist and feet includes a model of at least one of: the organs found between the waist and feet of the human being modeled by the demonstration device and a model of the vascular system found between the waist and feet of the human being modeled by the demonstration device.

24. The demonstration device according to claim 1 wherein the zone between the waist and feet includes elements found between the waist and feet of the human being modeled by the demonstration device.

25. The demonstration device according to claim 1 wherein the zone between waist and feet includes elements found between the waist and feet of the human being modeled by the demonstration device, including at least one of: a model of a digestive tract and a model of reproductive organs, and wherein at least two railway systems are provided in the elements found between the waist and feet of the human being modeled by the demonstration device.

26. The demonstration device according to claim 1 including elements which are modeled after hollow organs.

27. The demonstration device according to claim 1 including elements which are modeled after organs which are not hollow.

28. The demonstration device according to claim 1 wherein the physiological processes conducted by the organ or system simulated by said elements are compared to analogous processes.

29. The demonstration according to claim 1 wherein the demonstration device includes a longitudinal axis, the outer skin being constructed symmetrically to the longitudinal axis.

* * * * *